(12) United States Patent
Kirk et al.

(10) Patent No.: US 8,098,367 B2
(45) Date of Patent: Jan. 17, 2012

(54) LASER SLOPE ADJUSTMENT

(75) Inventors: Geoffrey Kirk, Broomfield, CO (US); Nicholas Talbot, Ashburton (AU)

(73) Assignee: Trimble Navigation Limited, Sunnyvale, CA (US)

( * ) Notice: Subject to any disclaimer, the term of this patent is extended or adjusted under 35 U.S.C. 154(b) by 337 days.

(21) Appl. No.: 12/481,923

(22) Filed: Jun. 10, 2009

(65) Prior Publication Data

US 2010/0157283 A1 Jun. 24, 2010

Related U.S. Application Data

(60) Provisional application No. 61/139,149, filed on Dec. 19, 2008.

(51) Int. Cl.
*G01B 11/26* (2006.01)
*G01B 5/02* (2006.01)
*G01B 5/18* (2006.01)
*G01C 9/00* (2006.01)

(52) U.S. Cl. ....... 356/28; 356/141.4; 702/158; 702/166; 702/150

(58) Field of Classification Search .................... 356/28, 356/141.4
See application file for complete search history.

(56) References Cited

U.S. PATENT DOCUMENTS

| | | | | |
|---|---|---|---|---|
| 3,813,171 A * | 5/1974 | Teach et al. | ............... | 356/139.02 |
| 4,895,440 A * | 1/1990 | Cain et al. | .................... | 356/5.08 |
| 5,100,229 A * | 3/1992 | Lundberg et al. | ............ | 356/3.12 |
| 6,314,650 B1 * | 11/2001 | Falb | ................................. | 33/286 |
| 6,741,949 B2 * | 5/2004 | Corcoran et al. | ............. | 702/167 |
| 7,064,819 B2 * | 6/2006 | Detweiler et al. | ......... | 356/141.1 |
| 7,110,102 B2 * | 9/2006 | Ohtomo et al. | ............ | 356/141.4 |
| 7,746,450 B2 * | 6/2010 | Willner et al. | ................... | 356/28 |
| 7,859,655 B2 * | 12/2010 | Troy et al. | ................... | 356/141.2 |
| 2002/0154294 A1 * | 10/2002 | Hedges et al. | ............. | 356/141.4 |
| 2009/0304035 A1 * | 12/2009 | Talbot et al. | ............... | 372/29.01 |
| 2010/0026551 A1 * | 2/2010 | Szwilski et al. | ................. | 342/22 |

* cited by examiner

*Primary Examiner* — Thomas Tarcza
*Assistant Examiner* — Antoine J Bedard
(74) *Attorney, Agent, or Firm* — Kilpatrick Townsend & Stockton LLP

(57) ABSTRACT

Tools and techniques for estimating elevations, including without limitation tools and techniques that employ mobile stations with laser detectors for receiving a beam emitted from a laser source and estimating an elevation of the mobile station based on the received beam. In some instances, a mobile station may be configured to identify, based on some or all of a variety of factors, a situation in which the elevation of the detector is likely to change to the extent that the slope of the emitter needs to be adjusted to account for this change in elevation. The mobile station may also be configured to inform the laser source that the slope of the emitted beam should be adjusted. In response, the laser source may adjust the slope of the emitted beam accordingly.

28 Claims, 11 Drawing Sheets

LASER SLOPE ADJUSTMENT

CROSS-REFERENCE TO RELATED APPLICATIONS

This application claims the benefit, under 35 U.S.C. §119 (e), of U.S. Provisional Application No. 61/139,149, filed Dec. 19, 2008 by Kirk et al. and entitled "Laser Slope Adjustment", the entire disclosure of which is incorporated herein by reference for all purposes.

This application is related to commonly-owned, co-pending U.S. patent application Ser. No. 12/135,623, field Jun. 9, 2008 by Nicholas Talbot et al. and entitled "Laser Transmitter and Methods" (the "'623 Application"), the entire disclosure of which is incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools for determining elevation, and more particularly, to laser-based tools for determining elevation of a mobile station.

BACKGROUND

In the construction field, precise estimation of elevation is of critical importance. For example, when grading a construction site, the construction crew must know the elevation of the equipment, in order to ensure that the site conforms to the plan designed by the engineers and architects. These elevations may be absolute, or they may be relative to some reference point on the site.

Global positioning system ("GPS") receivers (or other global navigation satellite system ("GNSS") equipment) are sometimes used to estimate elevations. Limitations in this technology have traditionally prevented the use of such systems for precise elevation measurements, however. Although recent enhancements in the technology have improved such systems, they often still cannot attain the precision required for many tasks.

Laser technology is often used for elevation estimation as well. Such systems typically will transmit a beam from a laser emitter to a laser detector. Based on the known elevation of the emitter, the slope of the beam (from the horizontal), and the distance between the emitter and the detector, the elevation of the detector (and, correspondingly, any equipment to which the detector is attached) can be calculated. Such systems typically can offer enhanced precision over GPS-based systems. However, existing laser-based systems have problems dealing with any significant changes in the elevation of the detector, which will cause the emitted beam to miss the detector. Some systems implement a fan beam (which effectively emits the beam over a broader area than a rotating spot beam), allowing for greater flexibility in the elevation of the detector relative to the emitter. Such systems are not without problems either, however. In particular, the use of a fan beam typically requires the use of more complex emitters and also requires significant calculation to determine elevation based on the received beam (since the emitted beam covers a broader vertical spectrum at the point of reception). A fan beam design also emits a larger fan beam, increasing power requirements and/or reducing range of the possible detection.

A potential solution to these issues is the use of a rotating spot beam in an emitter that is conditioned to calculate the proper slope of the beam. One such solution provides the emitter with GPS coordinates of the detector and forces the emitter to calculate the proper slope of the beam based on the location of the detector. This potential solution, however, requires significant computing power in the emitter (raising costs) and often prevents effective use of the emitter with multiple mobile stations (each of which is in a different location and each of which has its own detector) and reduces the ability to use other information from the mobile station, for example expected terrain that the detector is about to move over. This method also can have significant radio transmission overhead as the emitter needs to be in contact with the mobile station often Hence, this solution often will require multiple, expensive emitters to accommodate the number of detectors at use on a typical site.

A simpler solution would be to implement larger detectors, which would allow for greater variation in detector elevation before the detector ceases to receive the beam. Such detectors, however, require a relatively large number of sensors, which are quite expensive. Accordingly, the cost of implementing larger detectors can quickly become prohibitive.

Accordingly, there is a need in the art for tools and techniques that accurately and precisely estimate elevations while addressing these types of issues.

SUMMARY

Certain embodiments, therefore, provide solutions (including, without limitation, devices, systems, methods, software programs, and the like) for estimating elevations. In an aspect, certain of these tools can employ laser sources that do not require significant computational power, reducing the cost of such tools. Additionally, certain tools eliminate the need for large laser detectors, further reducing the cost of the tools. An additional benefit of some embodiments is the ability to support multiple mobile stations from a single laser source, resulting in still further cost savings.

Merely by way of example, some embodiments employ mobile stations that are configured to identify, based on some or all of a variety of factors, a situation in which the elevation of the detector is likely to change to the extent that the slope of the emitter needs to be adjusted to account for this change in elevation. Such factors can include, without limitation, the portion of the detector struck by the beam at a particular time (compared, in some cases, to the portion of the detector struck at a prior time and/or to threshold values); a direction and/or velocity of the mobile station (or equipment to which it is attached), which may be determined based on GNSS information; an anticipated elevation change, and/or the like. In such situations, the mobile station may inform the laser source that the slope of the beam should be adjusted, and, optionally, inform the laser source of an amount (or range of acceptable amounts) by which the slope should be adjusted.

In other embodiments, the laser source may be configured to receive the adjustment information from the mobile station and adjust the slope of the laser accordingly. In particular cases, in which the laser source supports multiple mobile stations, the laser source can be configured to receive a range of acceptable adjustments (or, from another perspective, a range of acceptable slopes) and determine an appropriate slope adjustment based on the needs of other mobile stations serviced by that laser source, so that, for example, an adjustment to accommodate one mobile station will not prevent other mobile stations from receiving the emitted beam. In particular cases, where conflicts may be inevitable, the laser source may be configured to prioritize one of the mobile stations over the other(s). Optionally, the laser source can transmit information about the adjusted slope of the beam to one or more of the mobile station(s), which then might update their elevation calculations accordingly.

The tools provided by various embodiments of the invention include, without limitation, devices, methods, systems, and/or software products that may be used to configure such systems/devices and/or implement such methods. Merely by way of example, a method might comprise one or more procedures, any or all of which are executed by various components of a system. Correspondingly, an embodiment might provide a system comprising one or more devices configured with instructions to perform one or more procedures in accordance with methods provided by various embodiments. Similarly, a computer program might comprise a set of instructions that are executable by a computer system (and/or a processor therein) to cause a device to perform such operations. In many cases, such software programs are encoded on physical and/or tangible computer-readable media (such as, merely by way of example, optical media, magnetic media, and/or the like).

Merely by way of example, one set of embodiments provides a system for estimating the elevation of a vehicle (which might be, for example, equipment used in earthmoving or digging operations, or any other type of vehicle). The system might comprise a laser source and one or more mobile stations. In a particular embodiment, the laser source comprises a laser emitter, which is configured to emit a beam having a slope that is adjustable by the laser source. In certain embodiments, the laser emitter is a rotating laser emitter, while in other embodiments, the emitted beam is a spot beam. In some cases, the laser source also includes a communication system, which might include a radio frequency transceiver (or any other appropriate communication hardware). In other cases, the laser source might include a position-sensing device (such as a global navigation satellite system receiver, and/or the like).

A mobile station in accordance with some embodiments comprises a laser detector, which might comprise an array of laser sensors. In some embodiments, the array of lasers is arranged substantially in a vertical configuration. The mobile station may also include a position-sensing device and/or a communication system as well. In a particular embodiment, the mobile station also includes a processing system. The processing system, in an aspect, may comprise a processor and a computer-readable medium having encoded thereon a set of instructions that are executable by the processing system to perform one or more operations.

Merely by way of example, the set of instructions might include instructions to establish an upper threshold value corresponding to a first portion of the array of laser sensors and/or a lower threshold value corresponding to a second portion of the array of laser sensors. The set of instructions might further include instructions to receive input data from the laser detector, and/or instructions to determine, based on the input data, a laser strike location value corresponding to a portion of the laser detector receiving the beam emitted by the laser emitter. In certain embodiments, there may be instructions to compare the laser strike location value with at least one threshold value selected from the group consisting of the upper threshold value and the lower threshold value. Moreover, the set of instructions, in accordance with an embodiment, includes instructions to determine, based at least in part on a comparison of the laser strike location value with the at least one threshold value, an amount by which the slope of the beam emitted by the laser emitter should be adjusted. There may also be instructions to transmit, via the mobile station's communication system, a notification for reception by the laser source's communication system. In an aspect, the notification might instruct the laser source to adjust the slope of the beam by the determined amount.

Correspondingly, in accordance with some embodiments, the laser source is configured to adjust, upon receipt of the notification, the slope of the beam in accordance with the notification. In some cases, the slope of the beam may be adjusted over a period during which the beam will not be received by the laser detector, and to transmit a message informing the mobile station of an adjusted slope of the beam emitted by the laser emitter. Further, the mobile station's processing system might comprise further instructions to determine, based on input from the position-sensing device, a position of the mobile station (which might include a lateral position and/or an elevation), and/or to calculate an elevation of the mobile station. In an aspect, this calculation may be based at least in part on the adjusted slope of the beam emitted by the rotating laser emitter, the position of the mobile station, a position of the laser source, and/or input data received from the laser detector. In some cases, there may also be instructions to set a height of a tool on the vehicle, based at least in part on the calculated elevation of the mobile station.

A system in accordance with another set of embodiments comprises a laser source and a mobile station. The laser source might comprise a communication system and/or a laser emitter configured to emit a beam having a slope that is adjustable by the laser source. The mobile station might comprise a laser detector, a communication system, and/or a processing system. The processing system might comprise a processor and a computer-readable medium having encoded thereon a set of instructions executable by the processing system to perform one or more operations.

Merely by way of example, in an embodiment, the set of instructions comprises instructions to receive input data from the laser detector; this input data might indicate a portion of the laser detector receiving the beam. The set of instructions might further include instructions to determine, based at least in part on the input data, that the slope of the beam should be adjusted, and/or instructions to transmit a notification instructing the laser source to adjust the slope of the beam. Accordingly, the laser source might be configured to adjust the slope of the beam based at least in part upon the notification.

A laser source in accordance with yet another set of embodiments comprises a laser emitter configured to emit a beam having a slope that is adjustable by the laser source, and a communication system. The laser source might be configured to receive, via the communication system, notification that the slope of the beam should be adjusted. Based at least in part upon this notification, the laser source might adjust the slope of the beam emitted by the laser emitter, and/or might then transmit a message via the communication system comprising information about an adjusted slope of the beam emitted by the laser emitter.

Another set of embodiments provides methods, including without limitation methods that may be implemented, at least in part, by devices and/or systems provided by other embodiments. An exemplary method comprises providing, at a first location, a laser source comprising a laser emitter. The method might further comprise providing, at a second location, a mobile station comprising a laser detector. In some embodiments, the method also comprises emitting a beam from the laser emitter, the slope of the beam being adjustable by the laser source, and/or receiving the emitted beam at a portion of the laser detector. In further embodiments, the method also includes determining, based at least in part on the portion of the laser detector receiving the emitted beam, that the slope of the emitted beam should be adjusted. (In some cases, determining that the slope of the beam should be adjusted comprises determining an amount, or a range of acceptable amounts, by which the slope of the beam should be adjusted.) The method may also comprise transmitting, from the mobile station, a notification instruction informing the laser source to adjust the slope of the emitted beam.

In some embodiments, the method further comprises adjusting, at the laser source, the slope of the emitted beam, based at least in part upon the notification. In some cases, adjusting the slope of the beam might comprise selecting a value within the acceptable range of slope values; this selected value might also allow a second mobile station to receive the emitted beam. In some cases, selecting a value might comprise prioritizing one of the mobile stations over the other mobile station(s). The method, then, might comprise notifying the second mobile station of the adjusted slope of the emitted beam.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1A:
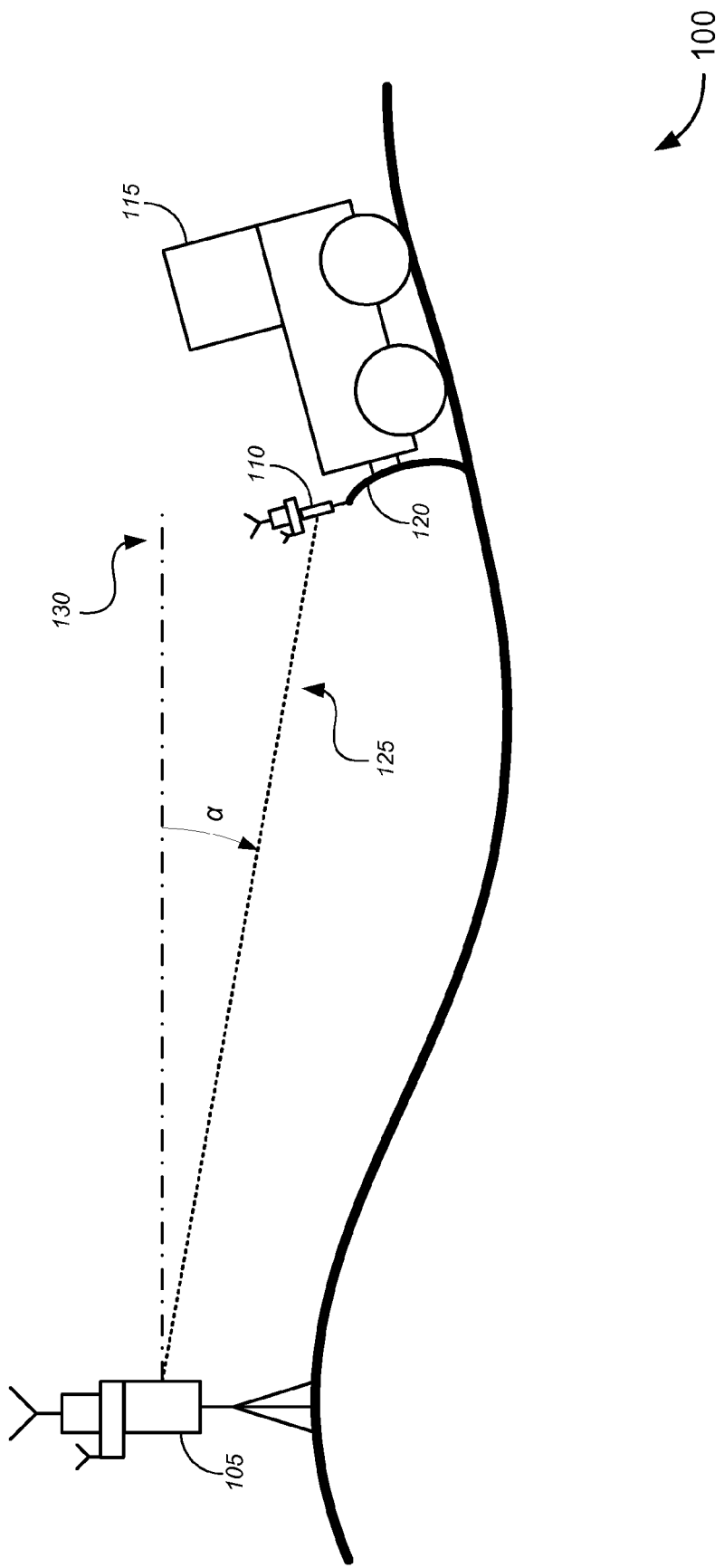
FIGS. 1A and 1B illustrate a system for determining elevation of a mobile station, in accordance with various embodiments.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for estimating elevations. (As used herein, the term "estimating" elevation is used to describe any process in which the elevation at a particular point—or of a particular mobile station, tool, etc.—is measured, estimated, calculated, or otherwise determined.) In particular, certain embodiments can provide enhanced precision (in some cases, to a tolerance of 3 mm or less) in measuring elevation, while providing for significant cost savings over other solutions. Merely by way of example, some embodiments employ laser sources that do not require significant computational power, reducing the cost of such tools. As used herein, the term "laser source" means any device that is capable of emitting a focused beam of light (which may or may not reside in the visible spectrum). In some cases, as described in further detail below, a laser source may be configured to rotate, such that the beam of light effectively is emitted as a plane of light, or might otherwise be capable of emitting a planar beam. Additionally, and/or alternatively, also as detailed below, a laser source might comprise (or be incorporated within) one or more devices that provide other functionality, including computing capabilities, navigation capabilities, communication capabilities, and/or the like.

Additionally, certain embodiments eliminate the need for a mobile station with a large laser detector, further reducing the cost of the tools. As used herein, the term "mobile station" refers to any device or system that is capable of receiving an emitted beam (e.g., a beam emitted from a laser source). Typically, a laser detector is the component of the mobile station that actually detects (receives) the emitted beam. In some cases, as detailed below, a mobile station may have significant additional capabilities and/or components, including computational capabilities and/or components, navigational communication capabilities and/or components, communication capabilities and/or components, and/or the like, but these are not required. In many cases, a mobile station (or components thereof) may be mounted on a vehicle or other type of equipment. In other cases, certain components of the mobile station may be incorporated within the control and/or communication systems of the vehicle/equipment. In other cases, however, a mobile station may be configured as stand-alone and/or man-portable equipment, which can be used, for example, by surveying crews. In some cases, the components of a mobile station may be integrated into a single enclosure; in other cases, these components may be distributed (for example, for a mobile station mounted on a vehicle, the laser detector may be mounted on the outside of the vehicle, while other components may be installed within the vehicle's interior).

An additional benefit of some embodiments is the ability to support multiple mobile stations from a single laser source, resulting in still further cost savings. While the specified embodiments described herein are often discussed in relation to construction and/or surveying projects, the reader should understand that the principles of various embodiments may be employed in many different implementations, and that the invention therefore is not limited to any particular application.

Merely by way of example, some embodiments employ mobile stations that are configured to identify, based on some or all of a variety of factors, a situation in which the elevation of the detector is likely to change to the extent that the slope of the emitter needs to be adjusted to account for this change in elevation. Such factors can include, without limitation, the portion of the detector struck by the beam at a particular time (compared, in some cases, to the portion of the detector struck at a prior time and/or to threshold values); a direction and/or velocity of the mobile station (or equipment to which it is attached), which may be determined based on GNSS information; an anticipated elevation change, and/or the like. In such situations, the mobile station may inform the laser source that the slope of the beam should be adjusted, and, optionally, inform the laser source of an amount (or range of acceptable amounts) by which the slope should be adjusted.

To illustrate some of these concepts, FIG. 1A illustrates a system 100 for estimating and/or calculating elevations, in accordance with one set of embodiments. These elevations may be absolute (e.g., feet above sea level) or relative to some specified point (e.g., a reference point on a site being surveyed, graded, etc.). The system 100 comprises a laser source 105 and a mobile station 110. In the illustrated embodiment, the mobile station 110 is attached to (or incorporated in) a piece of equipment 115, which might be a tractor, grader, front end loader, and/or any type of equipment for which precise elevation information is beneficial. In particular cases (as illustrated by FIG. 1), the mobile station 110 (or at least a component thereof, such as a laser detector) may be installed on a tool 120 that is part of (or coupled to) the equipment. Typically, such tools can include shovels, blades, scoops, and the like (to name but a few examples); with the laser detector (or mobile station 110) coupled with (or integrated with) the tool 120, an operator can obtain elevation data not only for the equipment 115, but for the tool 120 itself, allowing for precise grading and/or digging operations, etc.

In operation, the laser source 105 emits a beam 125, which is received by the mobile station 110, allowing for a determination of the elevation of the mobile station 110 and/or, by extension of the equipment 115 and/or tool 120. In a particular aspect, the emitted beam 125 has a slope that is defined by its angle $\alpha$ from the horizontal plane 130. (The angle $\alpha$ may either be negative, indicating a slope below the horizontal plane 130 in the direction of the mobile station 110, or positive, indicating a slope above the horizontal plane 130 in the direction of the mobile station 110; the definition of positive and negative, in this context, is of course arbitrary.)

The system 100 can be used to estimate the ground surface elevation at the location of the mobile station 110. As a simple example, the difference in elevation between the point on the detector illuminated by the beam and the point from which the beam is emitted is the horizontal distance between the emitter and the detector multiplied by the tangent of the angle $\alpha$. By adding or subtracting (as appropriate) the known height of the bottom of the detector from the ground surface (and/or the difference from the bottom of the detector to the illuminated point) and the height from emitter from the ground surface, the differences between the ground surface elevation at the laser source 105 and the ground surface elevation at the mobile station 110 may be calculated. By adding this difference to a known absolute elevation of the ground surface at the laser source 105, the absolute elevation of the ground at the mobile station may be calculated. Using similar calculations, a tool height may be set in order to achieve a desired surface elevation at the mobile station 105.

Figure 1B:
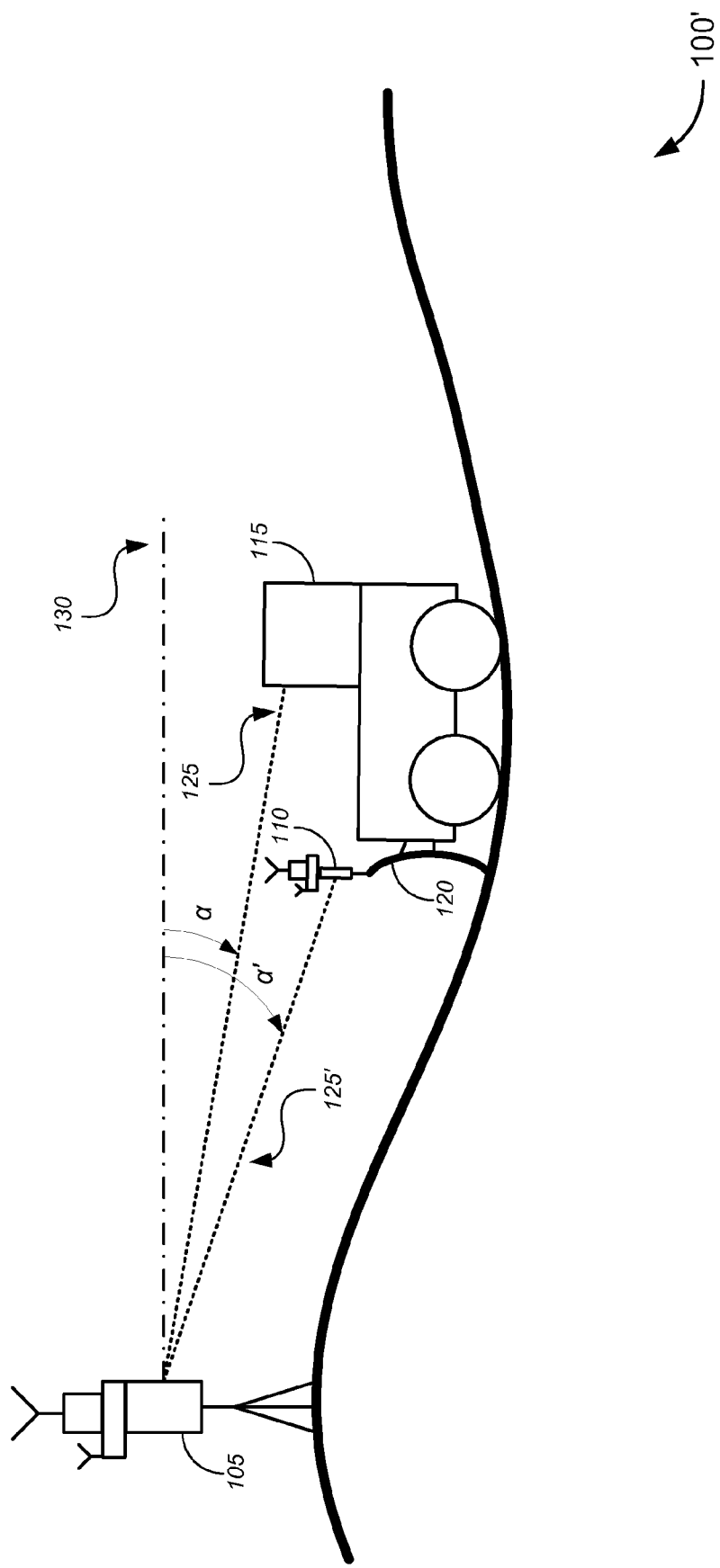

As illustrated by the system 100' of FIG. 1B, when the mobile station 110 moves, there is a possibility that the movement of the mobile station 110 (either laterally and/or vertically) will change the angle between the laser source 105 and the mobile station 110; consequently, in this situation, the mobile station 110 will no longer be able to receive the emitted beam 125. To remedy this problem, the beam (denoted 125' in FIG. 1B) should be adjusted to a new slope (defined by angle $\alpha'$ in FIG. 1B) to allow the mobile station 110 to continue to receive the emitted beam 125'. Hence, in accordance with certain embodiments, and as discussed in further detail below, the mobile station 110 is configured to detect a situation in which the mobile station 110 will no longer be able to receive the beam 125 and, correspondingly, to instruct the laser source 105 to adjust the slope of the beam 125 accordingly.

Figure 1C:
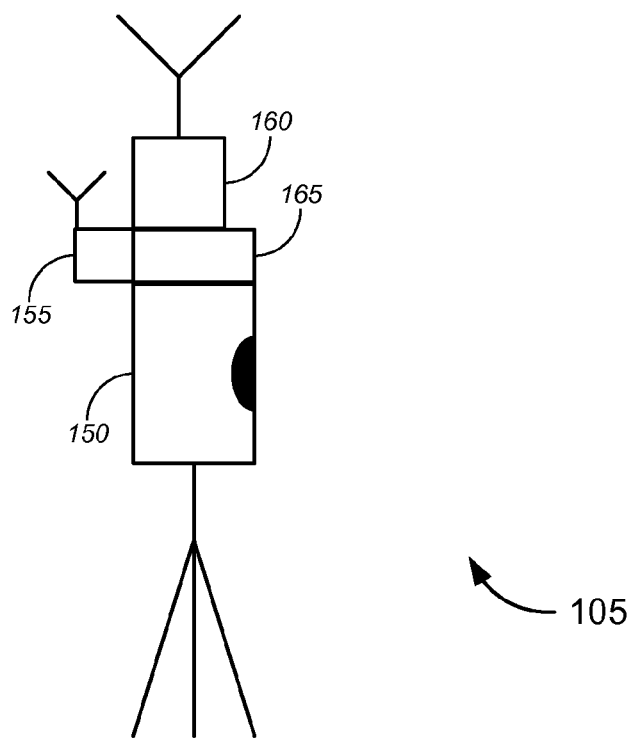
FIG. 1C is a block diagram illustrating a laser source, in accordance with various embodiments.

FIG. 1C illustrates a block diagram of a laser source 105 in accordance with one set of embodiments. The laser source 105 comprises a laser emitter 150, which is operable to generate and emit a beam of light (which may or may not fall within the visible spectrum, as noted above). A variety of commercially available laser emitters may be used in accordance with different embodiments. In various embodiments, the emitter 150 may be operable to emit a spot beam, a fan beam, or any other type of beam commonly known in the art. In particular aspects, as noted above, the emitter 150 may be configured to rotate or otherwise effectively produce a plane of light. In certain configurations, the emitter 150 includes one or more mirrors, prisms, stepping motors and/or other apparatus for adjusting the slope of the emitted beam. Merely by way of example, a typical laser source will emit a spot beam in a horizontal plane; advanced laser sources, such as those used in accordance with certain embodiments, provide a mechanism to tilt the emitter so as to project the beam or plane of the emitted light at a desired slope. Thus, in a particular aspect, the emitter 150 may be configured to emit a "tilting plane beam"; in other words, the emitter 150 may be configured to emit a plane of light (via rotation of a spot beam emitter, via a system of mirrors and/or prisms, etc.) with a slope that can be adjusted.

In another configuration, the emitter 150 may be configured to oscillate vertically, effectively producing beam that is raised and lowered to provide conical reference surfaces of varying inclination. Merely by way of example, the '623 Application, already incorporated by reference, describes a variety of configurations of laser emitters (described therein as "laser transmitters"); any of such emitters may be implemented in accordance with various embodiments herein. Additionally and/or alternatively, U.S. Pat. No. 6,643,004, filed Nov. 22, 2002 by Detweiler et al., U.S. Pat. No. 6,870,698, filed Jul. 15, 2003 by Detweiler et al., and U.S. Pat. No. 7,064,819, filed Jan. 25, 2005 by Detweiler et al. (the relevant portions of each of which are incorporated herein by reference), describe laser emitters that are configured to emit a "fan" beam. The laser source 105 may be configured to employ such emitters, perhaps with appropriate modification, to illuminate a laser detector in accordance with certain embodiments.

In some embodiments, the laser source 105 also includes a position-sensing device 155, which is operable to determine a position (either absolute or relative to some reference point) of the laser source 105. The position-sensing device 155 can be, in accordance with various embodiments, any of a variety of devices that can provide positional data. Such devices include, without limitation, GNSS receivers, devices for triangulating a position based on received signals (e.g., cellular communication devices, etc.), and/or the like. The position-sensing device 155 can be used to determine a position of the laser source 105; this position, as discussed below, can be used along with other data, to calculate the elevation of a mobile station.

The laser source 105 may also include a communication device 160 for communicating, inter alia, with one or more mobile stations. In some aspects, the communication device 160 may include a radio frequency ("RF") transceiver, which is operable to send and/or receive RF signals. Any appropriate type of RF transceiver may be used, in accordance with various embodiments (including, without limitation, devices that only receive signals or devices that only send signals), and the choice of frequency band for the transmission is discretionary.

In some embodiments, the laser source 105 also includes a processing system 165, which can comprise any of a variety of special purpose computers and/or general purpose computers configured with hardware, software, and/or firmware instructions to perform procedures in accordance with various embodiments (including the methods described below). An exemplary configuration of a computer that may be implemented as the processing system 165 is described below with respect to FIG. 9. In certain embodiments, the processing system 165 is responsible for overall control of the laser source 105, including processing communications and/or data received from or by the position-sensing device 155 and/or the communication device 160, configuring the laser emitter 150 to adjust the slope of the emitted beam, transmitting data (e.g., via the communication device 160) for reception by mobile stations or other devices, etc.

Figure 1D:
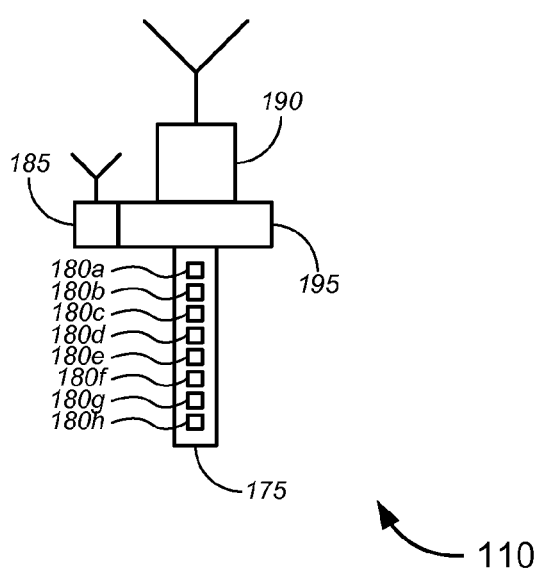
FIG. 1D is a block diagram illustrating a mobile station, in accordance with various embodiments.

FIG. 1D provides a block diagram illustrating a mobile station 110. As noted above, the components of the mobile station 110 may be integrated into a unitary device and/or may be distributed among a plurality of devices (some of which, for example, may be integrated with a piece of equipment to which the mobile station is attached). In the illustrated embodiment, the mobile station 110 comprises a laser detector 175, which is operable to receive (i.e., detect) a beam of light (e.g., a laser beam) emitted from a laser source, including without limitation a laser source as described above.

In an exemplary embodiment, the laser detector comprises a plurality of laser sensors 180, each of which individually can detect an emitted beam. In some embodiments, the laser sensors 180 are arranged in a substantially vertical arrangement (although there may be multiple detectors 180 at each level of the substantially vertical strata; for ease of illustration, the laser detector 175 is depicted on FIG. 1C as having a single detector 180 at each level). In an aspect, the sensors 180 may be divided into subsets, such that a first subset of the detectors (for example, sensors 180*a* and 180*b*) fall within one subset (considered the "upper" portion of the laser detector 175), while a second subset of the sensors 180 (for example, sensors 180*c*-180*f*) fall within a second subset (considered the "middle" portion of the detector), and a third subset (for example, sensors 180*g* and 180*h*) fall within a third subset (considered the "lower" portion of the detector). In a sense, these subsets are arbitrary and may be configured differently for different implementations; the description of the subsets provided herein is exemplary in nature and should not be considered limiting.

In some embodiments, the laser detector 175 is configured to determine which portion of the detector 175 (i.e., which subset of the sensors 180) is receiving an emitted beam at any given point in time and output that information. In other embodiments, the laser detector 175 may be configured to provide output about which specific sensor(s) 180 are receiving an emitted beam, and other components of the mobile station 110 might be configured to interpret that output to determine a portion of the detector 175 illuminated by the emitted beam. A variety of techniques may be used to make this determination.

The mobile station 110 may also include a position-sensing device 185 and/or a communication device 190. As noted above, these components may be incorporated within a unitary mobile station 110 and/or may be distributed (e.g., integrated within the control and/or communication systems of a vehicle or other equipment). In an aspect, the position-sensing device 185 and/or communication device 190 may be similar in architecture and/or function to those respective devices discussed above with respect to FIG. 1B.

The mobile station 110 may also include a processing system 195, which can comprise any of a variety of special purpose computers and/or general purpose computers configured with hardware, software, and/or firmware instructions to perform procedures in accordance with various embodiments (including the methods described below). An exemplary configuration of a computer that may be implemented as the processing system 195 is described below with respect to FIG. 9. In certain embodiments, the processing system 195 is responsible for overall control of the mobile station 110, including processing communications and/or data received by or from the position-sensing device 185, the communication device 190, and/or the laser detector 175, calculating an elevation of the mobile station 110 (and/or the equipment, tool, etc., to which it may be attached), transmitting data (e.g., via the communication device 160) for reception by laser sources, other mobile stations or devices, etc., controlling operation of equipment and/or tools to which the mobile station 110 may be attached (and/or providing data to a control system of such equipment and/or tools, to enable the control systems to control the equipment and/or tools based on the provided data), and/or the like.

Figure 2A:
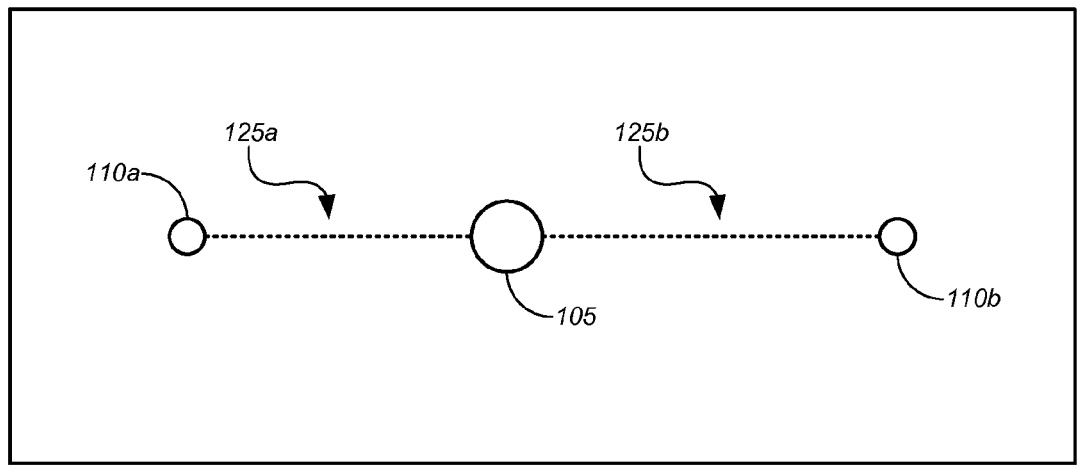
FIG. 2A is a plan drawing illustrating an elevation-determination system comprising multiple mobile stations, in accordance with various embodiments.
Figure 2B:
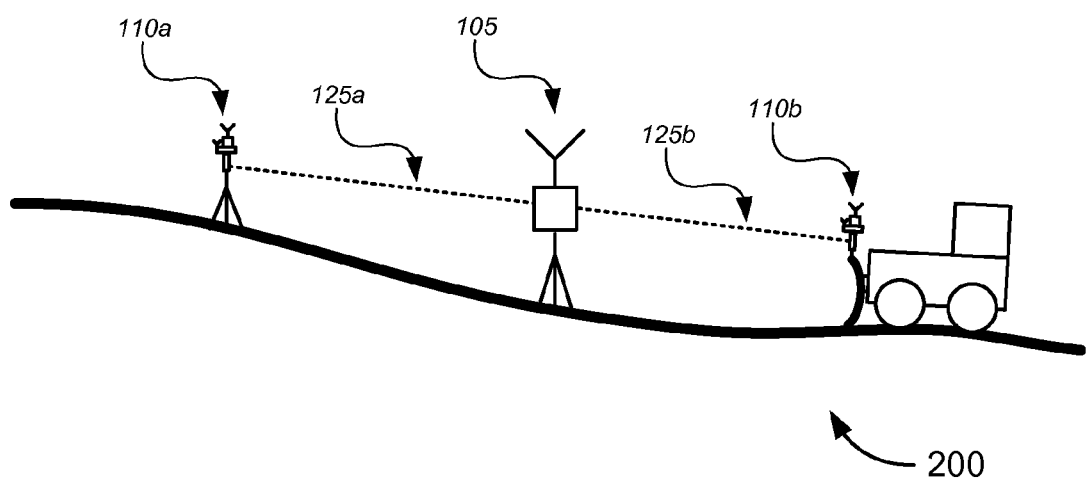
FIG. 2B is an elevation drawing illustrating the elevation-determination system of FIG. 2A.

In accordance with some embodiments, a laser source may be able to support multiple mobile stations, for example, by providing an emitted beam that is receivable by each of the mobile stations. To illustrate this functionality, FIG. 2A depicts a plan view of a system 200 comprising a laser source 105 and two mobile stations 110, and FIG. 2B depicts an elevation drawing of the same system 200. (While FIGS. 2A and 2B, for convenience, illustrate only two mobile stations 110, it should be appreciated that various embodiments may support any number of mobile stations.)

In the system 200, the laser source 105 (which might comprise a rotating laser emitter, to name but one example) effectively emits a beam 125 in a plane. (In the case of a rotating laser, the beam might be a spot beam that, due to the rapid rotation of the laser, effectively presents an emitted plane normal to the emitter's axis of rotation.) At certain points, the beam (depicted as line 125*a*) is received by a first mobile station 110*a*, while at other points, the beam (depicted as line 125*b*) is received by a second mobile station 110*b*. As shown in FIG. 2B, depending on the alignment of the first mobile station 110*a*, the laser source 105, and the second mobile station 110*b*, the same laser "plane" can be received by both mobile stations 110.

In the event, however, that one of the mobile stations (for example, the second mobile station 110*b*) moves, however, the slope of the emitted beam 125 may need to be adjusted, as described above (with respect to FIG. 1B) and, in further detail, below. This adjustment often will affect the elevation measurements for the first mobile station 110*a*. If the adjustment is relatively major, the beam 125*a* may no longer be received by the first mobile station 110*a* at all. Even if the adjustment is relatively minor (such that the beam 125*a* continues to be received by the first mobile station), however, it is likely that elevation calculations for the first mobile station 110*a* will be affected, since the beam 125*a* most likely will be received by a different portion of the first mobile station's 110*a* detector.

Certain embodiments can use a variety of techniques to mitigate these issues. For example, as described in further detail below, in some cases, when the second mobile station 110*b* requests adjustment of the beam's slope, it might provide a range of acceptable adjustments. The laser source 105, in selecting a new slope for the beam 125, may be configured to take into account the impact any adjustment might have on other mobile stations (e.g., the first mobile station 110*a*), for example, by selecting a slope within the acceptable range for the second mobile station 110*b* that still will allow the mobile station 110*a* to receive the beam 125. Additionally, and/or alternatively, the laser source 105 might also communicate to the first mobile station 110*a* a value of the adjusted slope of the beam 125, so that the first mobile station can revise its calculation model to account for the different slope of the received beam 125*a*. (In some embodiments, the revision of the calculation model may be performed automatically by the processing system of the first mobile station 110*a*, based on the information received from the laser source.)

Another possible technique to resolve such conflicts is the prioritization of one mobile station (e.g., the second mobile station 110*b*) over other mobile stations (e.g., 110*a*) serviced by the laser source 105. Hence, in the event of an irreconcilable conflict between the mobile stations 110*a* and 110*b*, the laser source 105 will elect to adjust the slope of the emitted beam so as to allow the prioritized mobile station 110*b* to continue to receive the emitted beam 125*b*, even if that means that the other mobile stations (e.g., 110*a*) will no longer be able to receive the beam. In certain cases, the laser source 105 may be configured to provide notification to any mobile stations that will no longer be able to receive service. In some cases, these mobile stations may be configurable (e.g., by adjustment of a mounting stand, etc.) to be adjusted in height to receive a beam on the adjusted slope. In such cases, the mobile station 110*a* might provide (on a display device, for example) instructions to allow an operator to adjust the height of the mobile station 110*a*, and/or if automated height adjustment is available, to adjust the height automatically.

In yet other cases, the laser source 105 may be sufficiently sophisticated to be able to emit the beam on different slopes in different directions. Merely by way of example, in the case of a rotating emitter, the emitter may be configurable to emit the beam on a first slope in a first direction, and then to change the emission angle during the rotation, such that the beam is omitted on a different slope in another direction. This process can be repeated, such that the emitted beam oscillates between a first slope in a first direction (to be received by a first mobile station) and a second slope in a second direction (to be received by a second mobile station). The laser source 105, in some cases, may use this technique to provide service to two mobile stations 110 that might otherwise have an irreconcilable conflict. In this situation, the laser source 105 might be configured to adjust only one of these slopes in response to instructions received from a mobile station.

FIGS. 3-6 illustrate various methods that can be used to determine an elevation of a mobile station, to determine whether a laser's slope should be adjusted, and/or by how much a laser's slope should be adjusted, in accordance with certain embodiments. While the methods of FIGS. 3-6 are illustrated, for ease of description, as different methods, it should be appreciated that the various techniques and procedures of these methods can be combined in any suitable fashion, and that, in some embodiments, the methods depicted by FIGS. 3-6 can be considered interoperable and/or as portions of a single method. Moreover, while the methods illustrated by FIGS. 3-6 can be implemented by (and, in some cases, are described below with respect to) the systems 100 and 100' of FIGS. 1A and 1B and/or the system 200 of FIGS. 2A and 2B (or components thereof), these methods can be implemented using any suitable hardware implementation. Similarly, while the systems 100 and 100' of FIGS. 1A and 1B and/or the system 200 of FIGS. 2A and 2B (and/or components thereof) can operate according to the methods illustrated by FIGS. 3-6 (e.g., by executing instructions embodied on a computer-readable medium), the systems 100 and 200 can also operate according to other modes of operation and/or perform other suitable procedures.

Figure 3:
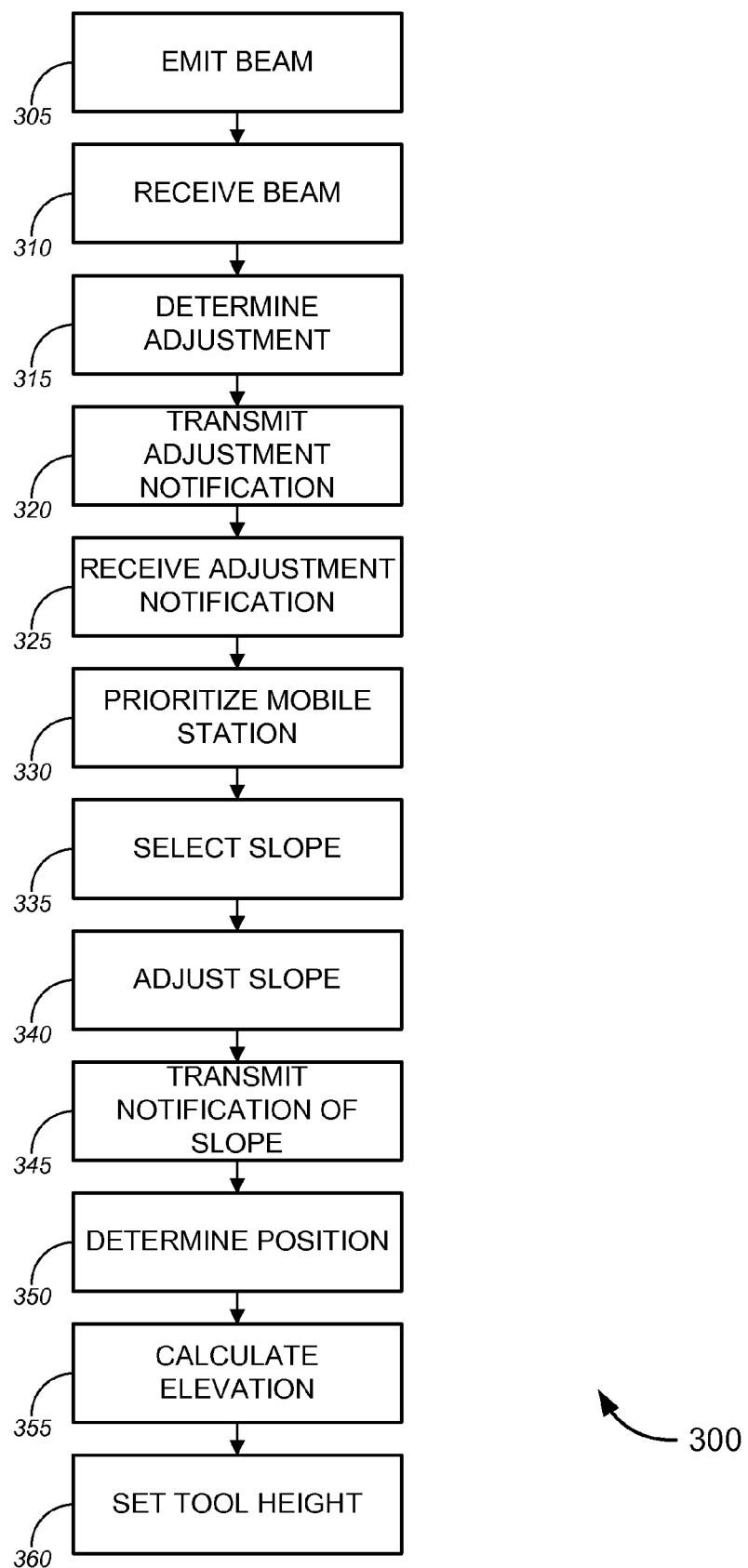
FIG. 3 is a process flow diagram illustrating a method of determining elevation of a mobile station, in accordance with various embodiments.

FIG. 3 illustrates a method 300 of estimating elevations using a laser source and one or more mobile stations. The method 300 comprises emitting a beam (e.g., a beam of light, as described above) from an emitter in a laser source (block 305). The beam, in an aspect, has a slope that is adjustable by the laser source, as described above. The method 300 further comprises receiving the emitted beam at a mobile station (block 310). More particularly, in some cases, the beam will be received by a laser detector (and, specifically, one or more laser sensors in the laser detector) at the mobile station. At block 315, the method 300 comprises determining that the slope of the emitted beam should be adjusted (and/or, in some cases, determining an amount by which the slope of the beam should be adjusted).

In a particular set of embodiments, this determination is made at the mobile station that receives the beam. Merely by way of example, the processing system in the mobile station may be configured with software, hardware and/or firmware instructions that can be executed by the processing system to determine that the slope of the beam should be adjusted (and/or an amount or range of amounts by which the slope should be adjusted). There are a variety of ways in which this determination can be made. Merely by way of example, FIGS. 4 and 5, respectively, illustrate two methods for determining that the slope of a received beam should be adjusted, and/or by how much the slope should be adjusted.

Figure 4:
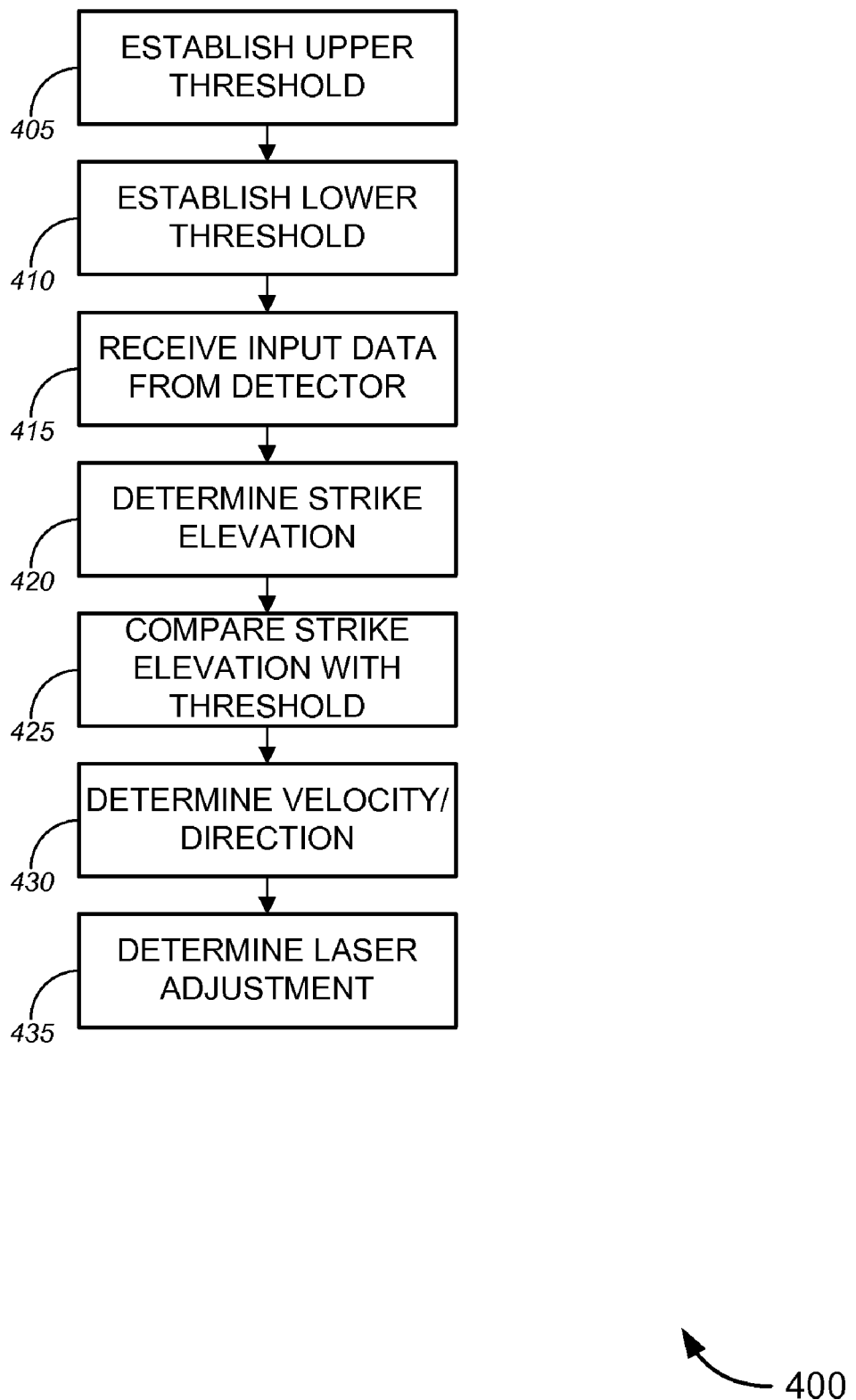
FIGS. 4 and 5 are process flow diagrams illustrating methods of determining whether a laser slope should be adjusted, in accordance with various embodiments.

FIG. 4, for example, illustrates a method 400 of determining that the slope of a received beam should be adjusted and, optionally, for determining an amount of adjustment (or range of acceptable adjustments and/or slopes). The method 400 may be performed, for example, by the processing system of a mobile station, based perhaps on instructions executed by that processing system. The method 400 comprises, in one embodiment, establishing an upper threshold value corresponding to an upper portion of the mobile station's detector (e.g., a subset of laser sensors on the upper portion of the detector) (block 405) and/or establishing a lower threshold value corresponding to a lower portion of the mobile stations detector (e.g., a subset of laser sensors on the upper portion of the detector) (block 410).

The way in which these threshold values are defined often will depend on the nature of the laser detector and its output. Merely by way of example, the detector may be configured to output a different value (or provide output on different leads) depending on which sensors receive a beam. The upper and lower threshold values thus might correspond to the values (or leads) corresponding to particular sensors that can be considered as a boundary for the upper and/or lower portions of the detector. To illustrate one example, by reference to FIG. 1D, sensor 180b might be defined as the upper threshold. If the detector 175 provides output indicating that any sensor above the sensor 180b, such as sensor 180a (or in some cases, depending on how the threshold is defined, any sensor above or including sensor 180b), is receiving the emitted beam, the output from the detector 175 will be considered to meet or exceed the upper threshold. Similarly, the sensor 180g might be defined as the lower threshold, such that output from the detector 175 indicating that a sensor (such as the sensor 180h) below the sensor 180g (and/or the sensor 180g itself, depending on how the threshold is defined) is receiving the emitted beam, that output would be considered to meet or exceed the lower threshold.

From this example, it should be appreciated that there are many techniques which the upper and/or lower thresholds are defined; for purposes of various embodiments, all that matters is that the upper and/or lower thresholds correspond to some portion at the upper and/or lower end of the detector, such that reception of a beam at or beyond the threshold indicates that the beam is striking the detector near either the upper or lower end of the detector.

The method 400 further comprises receiving (typically at the mobile station's processing system) input data from the laser detector (block 415). This input data generally will provide an indication that the laser detector is receiving the emitted beam, as well as indicate a portion (e.g., by reference to FIG. 1D, one or more sensors 180) of the detector receiving the emitted beam. Based on this input data, the processing system determines a laser strike location value (block 420), which corresponds to the portion of the detector receiving the emitted beam (referred to herein as the laser or beam "strike location" on the detector). In some aspects, the laser strike location value might refer to a distance from some reference point on the detector (such as the bottom of the detector, etc.) or another relative value, such as an elevation difference between the strike point and some reference elevation (which might be the elevation of the base of the mobile station, the elevation of the laser source, etc.). In other cases, the laser strike location value might be expressed as an absolute elevation value (e.g., a distance from sea level, etc.). This laser strike location value is then compared with at least one threshold value (block 425), which can be the upper threshold and/or the lower threshold described above.

In some embodiments, the processing system might also be configured to determine a velocity and/or direction of travel of the mobile station (block 430). Merely by way of example, if the mobile station comprises a position-sensing device, input from the position-sensing device can be used to determine the direction and/or velocity of travel of the mobile station (e.g., by comparing position values at multiple points in time). This determination may be performed internally in the position-sensing device, which might then provide the velocity and/or directional information to the processing system; alternatively, the position-sensing device might merely provide multiple location data points, and the processing system might be configured to calculate the velocity and/or directional data.

The method 400 further comprises determining that the slope of the emitted beam (referred to herein as the "beam slope") should be adjusted (block 435). In some cases, the processing system at the mobile station makes this determination, although in accordance with other embodiments, a different device (such as the laser source) might make this determination. The determination of whether the beam slope should be adjusted can take into account a variety of factors. Merely by way of example, in some cases, it may be determined that the beam slope should be adjusted based only on whether the laser strike location value exceeds one of the threshold values. For instance, if the beam currently has a negative slope (below horizontal) and the laser strike location value exceeds the upper threshold, the beam slope should be increased (in absolute terms), such that the beam would strike the detector at a lower point after adjustment.

In a more sophisticated example, information other than laser strike values might be included in determining whether the beam slope should be adjusted. Merely by way of example, in some cases, the velocity and/or direction of the mobile station (and/or the equipment/vehicle to which it is attached) may be considered (either alone or along with other factors) when determining whether the beam slope should be adjusted. For instance, if the mobile station is not moving, it may be determined that the beam slope need not be adjusted, even if the beam is striking the detector outside one of the thresholds. As a more complex example, if the beam strike location value is at one of the threshold values, and the direction and/or velocity of the mobile station indicate that the beam is moving further from the center of the detector (for example, if the mobile station is below the laser source and the beam strike location value is at or above the threshold, and if the velocity and direction of the mobile station's movement indicate that the mobile station is moving toward the laser source), it might be determined that the beam will soon miss the detector, such that the beam slope should be adjusted.

In some cases, additional data might be taken into account as well. Merely by way of example, if the mobile station is programmed with an existing topology of the site (or a desired topology of the site), the velocity and direction of movement of the mobile station might be used to calculate a future elevation of the mobile station, and this future elevation, perhaps in combination with laser strike location data, can be used to make a determination that the beam slope should be adjusted. Merely by way of example, if the topological data, in combination with the directional and/or velocity data, indicate that the mobile station soon will be rising in elevation, it may be determined that the beam slope should be adjusted upward to accommodate this change in mobile station elevation.

Figure 5:
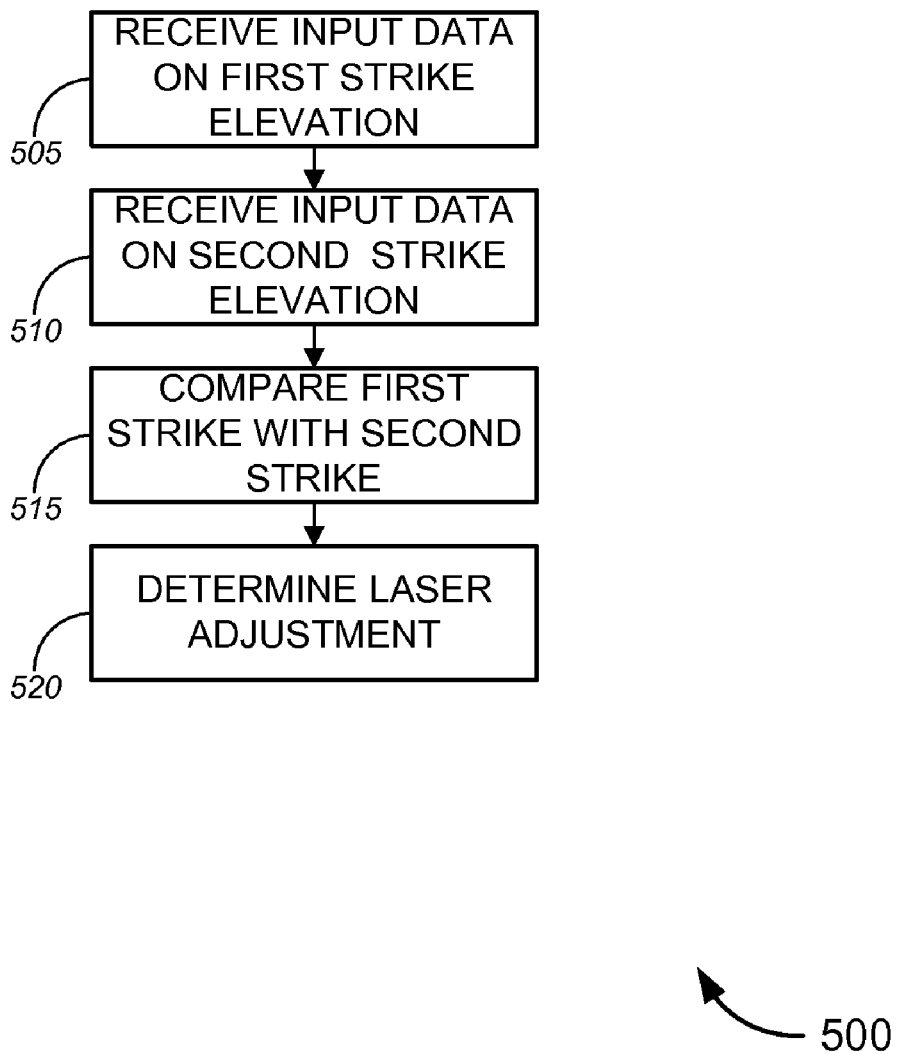

In yet other cases, a simpler model may be used to determine whether a laser slope should be adjusted. For example, FIG. 5 illustrates a method 500 of determining whether the beam slope should be adjusted in accordance with another set of embodiments. The method of FIG. 5 is an example of a technique that does not require the establishment of threshold values. (It should be noted that many such techniques may be used, in accordance with various embodiments.)

The method 500 comprises receiving (e.g., at a processing system) a first set of input data (e.g., from a laser detector) about a first strike location value (block 505), corresponding to a first portion of the laser detector receiving the emitted beam at a first point in time. The method 500 further comprises receiving a set of input data from the laser detector (block 510), corresponding to a second portion of the detector receiving the emitted beam at another point in time. The method 500 further comprises comparing the first laser strike location value with the second laser strike location value (block 515). Based on this comparison, a determination can be made that the slope of the emitted beam should be adjusted (block 520). Merely by way of example, if the first laser strike location value indicates that the beam was received in the middle of the detector, and the second laser strike location value indicates that the beam was received at the top end of the detector, it may be determined that that slope of the beam should be adjusted in an upward direction, so as to bring the laser strike location back toward the center (or perhaps the lower portion) of the detector.

Figure 6:
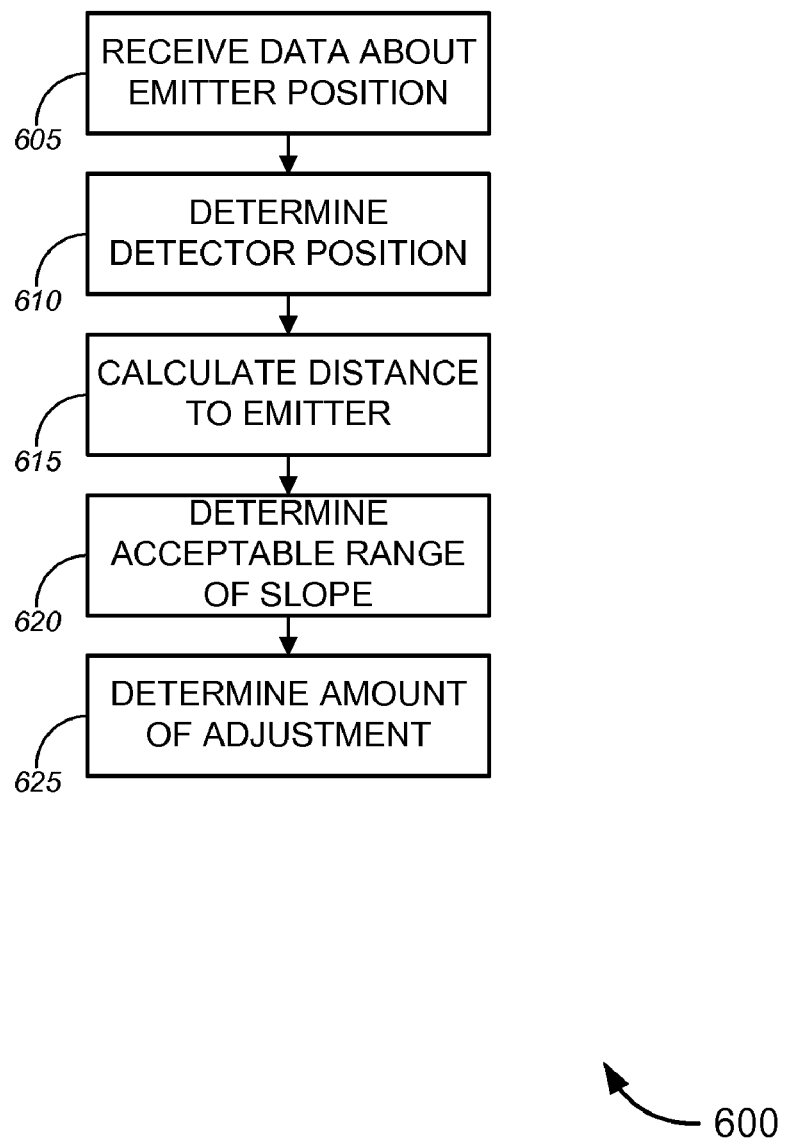
FIG. 6 is a process flow diagram illustrating a method of determining an amount (or an acceptable range of amounts) by which a laser slope should be adjusted, in accordance with various embodiments.

In some cases, it may be desirable to determine not only that a beam slope should be adjusted, but also by how much the slope should be adjusted. Accordingly, FIG. 6 illustrates a method 600 of determining an appropriate amount (or a range of acceptable amounts) by which the slope should be adjusted. (It should be noted that this adjustment can be viewed in relative terms, i.e., an adjustment from a current slope, or in absolute terms, i.e., a slope—or range of slopes— that would provide acceptable performance, irrespective of the current slope. The distinction between a relative amount of adjustment and an absolute adjustment is arbitrary, and the same techniques may be used to determine either value; the only difference is whether the current slope is taken into account.) Typically, the method 600 will be performed (e.g., by the processing system in a mobile station and/or laser source) after it has been determined (as described above, for example) that the slope of the emitted beam should be adjusted.

The method 600 comprises, in some embodiments, receiving, at the mobile station, data about a position of the laser emitter (e.g., data about the position of the laser source) (block 605). This data typically will have been transmitted from the laser source, which might generate the data based on user input, data received from/by a position-sensing device, and/or the like. At block 610, the method comprises determining the position of the mobile station, or more precisely, the position of the laser detector (which typically will be the same as, or similar to, the position of the mobile station). Typically, this position will be determined based on data received by/from a position-sensing device that is incorporated within (or in communication with) the mobile station. (It should be noted that, while the method 600 describes the process for an embodiment in which the mobile station calculates the amount by which the beam slope should be adjusted, other embodiments might perform this calculation at the laser source, or any other appropriate location. In such cases, the position data for the mobile station and laser source can provided to any such location, using transmissions similar to those described above.)

The method 600 comprises calculating a distance from the laser detector to the laser emitter (block 615). Typically, this distance is calculated based on the determined positions of the emitter and detector, and the distance may be a lateral (horizontal) distance, disregarding any changes in elevation between the two devices. This is not necessary in all embodiments, however, and other techniques for measuring and/or calculating this distance may be used. Merely by way of example, in some cases, laser rangefinding (based, perhaps, on the beam emitted by the laser source) can be used to determine a linear distance (which typically would not disregard elevation changes) between the emitter and the detector.

At block 620, the method 600 comprises determining an acceptable range of slope values for the emitted beam (as used herein, the term "slope value" refers to any value or identifier that describes, either quantitatively or qualitatively, the slope of the emitted beam; merely by way of example, the slope value may be expressed in degrees from horizontal, degrees from present slope, preset slope identifiers each of which identify a certain slope angle, and/or emitter tilt increments, or any other appropriate units). In an embodiment, this calculation is based on one or more of several factors. Merely by way of example, in some cases, the known current slope of the beam (which might be transmitted from the laser source to the mobile station using the respective communication systems of the two devices, in embodiments in which the mobile station determines an acceptable range of slope values), the strike location of the beam on the detector, the endpoints of a preferred strike region on the detector (which might correspond to the thresholds described above), the direction of movement of the mobile station (or detector), and/or the velocity of movement of the mobile station (or detector) may be considered when determining the acceptable range of slopes for the emitted beam.

Figure 7:
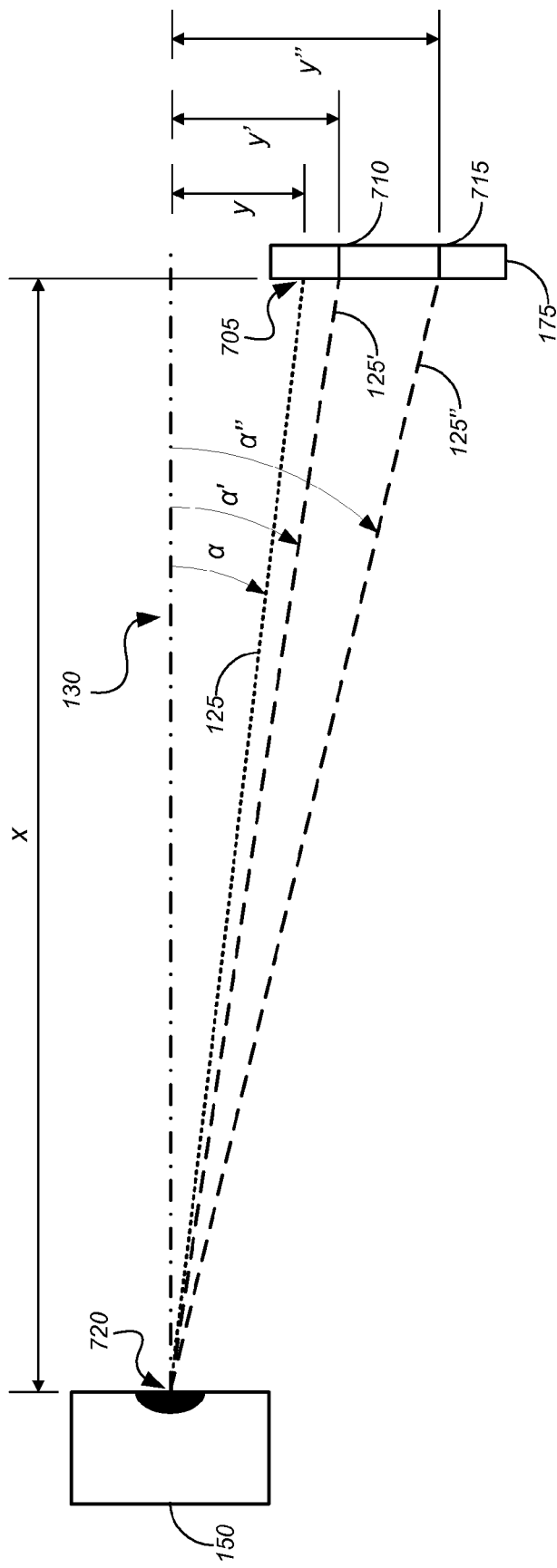
FIGS. 7 and 8 illustrate a system for determining elevation of a mobile station, in accordance with various embodiments.

As a simple example, in a situation in which the emitted beam currently is striking the detector above the upper threshold, determining a range of acceptable slopes might comprise determining a first beam slope that corresponds to the upper threshold and a second beam slope that corresponds to the lower threshold. To illustrate, consider FIG. 7, which illustrates an emitter 150 and a detector 175, with an emitted beam 125, having a slope $\alpha$, which strikes the detector at a strike point 705, which is above an upper threshold 710. An acceptable range of beam slope values might fall between $\alpha'$ and $\alpha''$, which correspond to emitted beams 125' and 125'', which strike the detector 175 at the upper threshold 710 and lower threshold 715, respectively. To calculate this range, the method 600 might first calculate a difference y in elevation between the emission point 720 of the beam 125 and the strike point 705. This value y can be calculated as the horizontal distance x between the emitter 150 and the detector 175, multiplied by the tangent of the known slope $\alpha$. To identify the elevation difference y' between the emission point 720 and the upper threshold 710, the method would merely add the known distance between the strike point 705 and the upper threshold 710 to the value y (already calculated above). A similar procedure could be used to calculate the elevation difference y'' between the emission point 720 and the lower threshold 715. The value of $\alpha'$ for a beam 125' striking at the upper threshold 710 then can be calculated as the inverse tangent of y'/x, while the value of $\alpha''$ for a beam 125'' striking at the lower threshold 715 can be calculated as the inverse tangent of y''/x. (If the linear distance between the emission point 720 and the strike point is used, rather than the horizontal distance, similar calculations can be performed by substituting the sine and inverse sine functions, respectively, for the tangent and inverse tangent functions described above.)

In other cases, similar calculations could be performed while taking into account factors such as mobile station movement velocity and direction, or estimated future changes in mobile station elevation (for example, by adjusting the upper threshold 710 and/or lower threshold 715 to account for these factors, or by substituting for the thresholds other desired strike locations, based on these factors).

At block 625, the method 600 comprises determining an amount by which the beam slope should be adjusted. In some embodiments, this determination may be made at the mobile station, while in other embodiments, the determination may be made at the laser source (or any other appropriate location). In an aspect of some embodiments, this amount may be determined based, at least in part, on a comparison of the strike point of the beam on the detector (represented by a laser strike point elevation value, as noted above) with one or more thresholds. Merely by way of example, in some cases, the slope of the emitted beam may be adjustable in increments, and if the strike point falls above an upper threshold, the determination of an amount by which the beam slope should be adjusted might merely comprise determining that the beam slope should be adjusted downward by one increment (or by more than one increment, depending on the distance between the threshold and the strike point). This technique might be performed iteratively, with the beam slope being adjusted (and a new determination being made that the beam slope should be adjusted further) incrementally until the beam slope falls at an acceptable point on the laser detector.

In other cases, the determination of the amount by which the beam slope should be adjusted might entail a more complex technique. Merely by way of example, as described in further detail below, the mobile station might determine an acceptable range of beam slope values (and/or determine an acceptable range of slope adjustments by subtracting the current slope value from the range of acceptable slope values), and the laser source might determine an amount by which the beam slope should be adjusted, based, perhaps, on other factors such as the need to provide service to other mobile stations, etc.). Alternatively and/or additionally, a mobile station might select an appropriate amount by which the slope should be adjusted using a process similar to that described above for determining an appropriate range of slope values, except that the mobile station might select a discrete point on the laser detector as the desired location for the new strike point and calculate an amount by which the slope should be adjusted to force the laser source to emit a beam that will strike the detector at the desired strike location.

As noted above, in some embodiments, the determination of whether the beam slope should be adjusted (and, optionally, an amount or range of acceptable amounts by which the beam slope should be adjusted) may be performed at the mobile station. In such embodiments, the mobile station transmits, for reception by the laser source, a notification that the slope of the emitted beam should be adjusted (block 320), and the laser source receives this notification (block 325). In an aspect of some embodiments, this notification is transmitted and/or received by the communication systems of the mobile station and laser source, respectively, based on control of those communication systems by the processing systems of the respective devices.

The nature of the notification generally will depend on the embodiment. In some cases, the notification might merely consist of an instruction to adjust the slope of the emitted beam, perhaps with additional information specifying whether the beam slope should be adjusted up or down. In other embodiments, a more detailed notification might be transmitted, which can include information about an amount by which the beam slope should be adjusted and/or a range of acceptable adjustment amounts, which might be calculated by the mobile station as described above. (These adjustment amounts might be expressed as relative values, such as an adjustment from the current beam slope, or as absolute values, such as a desired beam slope value or range of acceptable slope values.)

In certain embodiments, upon reception of the notification that the slope of the emitted beam should be adjusted, the laser source typically will adjust the slope of the beam accordingly, as described in further detail below. Before doing so, however, the laser source, in some embodiments, may perform some preliminary operations.

Consider, for example, a situation in which a laser source is configured to support multiple mobile stations. In such situations, it may be the case that the requested slope adjustment might create a conflict between the needs of two (or more) served mobile stations. As noted above, there are several techniques that may be used to prevent and/or mitigate such a conflict.

For instance, in some cases, the method 300 may comprise prioritizing one mobile station over the other(s) (block 330). Merely by way of example, a laser source (or, more precisely in many cases, the processing system of the laser source) may be configured with a prioritized list of mobile stations (which may be identified by an identifier and/or a station type, such as vehicular, handheld, etc.) and/or the location of each mobile station currently being served. In some cases, for example, a mobile station may transmit its identifier and/or its location to the laser source that is serving the mobile station; the laser source may, in turn, store a table of served mobile stations and/or their corresponding locations. The laser source may prioritize the mobile stations based on user input (e.g., input identifying a mobile station as a high-priority mobile station) and/or based on a set of stored rules (e.g., a rule specifying that that a vehicle-based mobile station should be prioritized over a handheld or man-portable mobile station, etc.).

When the laser source receives an instruction to adjust the slope of the emitted beam, the laser source may be configured to identify the mobile station transmitting the instruction (e.g., based on an identifier included with the notification that the slope should be adjusted) and determine whether that mobile station has a higher priority than any other currently-served mobile stations. If that is the case, the laser source may adjust the slope of the beam accordingly, as described further below. If the mobile station requesting the slope adjustment has a lower priority than another mobile station served by the laser source, the laser source may determine that the slope of the beam should not be adjusted (or should not be adjusted at that time), and optionally may notify the requesting mobile station accordingly.

In addition to, or as an alternative to, prioritizing one mobile station over others, the laser source may be configured to select a beam slope that can accommodate two or more of the served mobile stations (block 335). Merely by way of example, if a mobile station transmits a notification that the beam slope should be adjusted, along with a range of acceptable slope values, the laser source may select, from the range of acceptable slope values, a beam slope that will accommodate the requesting mobile station, but that will also allow one or more of the other served mobile stations to continue to receive the emitted beam. (Of course, if the laser source is not serving any other mobile stations, it may select a slope adjustment arbitrarily, such as selecting the slope adjustment in the middle of the specified range, selecting the maximum adjustment from the range, selecting the minimum adjustment from the range, etc.)

In some cases, the laser source (and/or the processing system of the laser source) makes this determination by identifying the location(s) of the served mobile stations other than the mobile stations requesting the slope adjustment (either by consulting a table of stored locations for served mobile stations or by transmitting a message requesting location information and receiving the location information in return). In addition, the laser source may obtain from the non-requesting mobile stations information about the beam strike location on the detectors of those mobile stations and/or the thresholds of those detectors—for instance, the laser source may request such information from the non-requesting mobile stations, which may perform a procedure similar to that described above with respect to FIG. 4 and/or 5 and provide beam strike information to the laser source, which can determine whether the adjusted slope would allow the non-requesting mobile station(s) to continue to receive the emitted beam. Alternatively, the laser source may request that a mobile station determine whether a proposed adjusted beam slope would still allow that mobile station to receive the beam (in which case, the mobile station could perform a procedure similar to that described with respect to FIG. 6 to determine whether the proposed adjusted slope would allow the mobile station's detector to receive the beam on the adjusted slope). Other techniques may be used as well to determine whether a proposed adjusted slope would accommodate one or more served mobile stations other than the station requesting the slope adjustment.

There are, of course, other techniques for resolving conflicts between the needs of two served mobile stations. Merely by way of example, some lasers may be configured to provide multi-planar emissions (for example, by adjusting an emitter to project a beam on a first slope when aimed in a first direction and readjusting the emitter to project a beam on a second slope in a second direction, in effect oscillating the slope of the beam as the emitter rotates). In such cases, the laser source might adjust the slope of the beam in one plane, but not adjust (or adjust by a different amount) the slope of the beam in another plane. From these examples, one of skill in the art can appreciate that various embodiments can employ many different techniques to resolve conflicts between served mobile stations.

Upon receiving the notification that the slope of the emitted beam should be adjusted (and/or, optionally, selecting a slope value from a range of acceptable values, as described above), the laser source adjusts the slope of the emitted beam (block 340). As noted above, the laser source includes an adjustment mechanism (which might include one or more stepping motors, etc.) for adjusting the angle of the laser emitter. In an embodiment, the processing system of the laser source provides appropriate instructions to the adjustment mechanism for adjusting the slope of the emitted beam in the selected amount (or to match a selected angle). In some cases, the slope of the beam is adjusted over a period in time in which the beam will not be received by the detector (e.g., while the emitter is not emitting, or while a rotating emitter is facing away from the detector), so as not to confuse the mobile station with a beam that is moving in the vertical direction.

In some embodiments, the laser source transmits a notification message informing one or more of the served mobile stations that the slope of the emitted beam has been adjusted (block 345). In some cases, for example when the laser source has selected a slope from a range of acceptable slopes, or when the laser source serves mobile stations other than the mobile station requesting the adjustment, the notification message may specify an amount of adjustment (and/or the new value) of the slope of the emitted beam. In other cases, such as when the laser source serves only one mobile station, and that mobile station has specified an amount of adjustment, the notification may not need to include information about the adjusted slope (and in fact the notification itself may be unnecessary). In some cases, a single notification message may be transmitted for reception by all served mobile stations, while in other cases, separate notifications may be transmitted for reception by each mobile station. In some cases, the notification message may include other information (such as the location of the laser source, the elevation of the laser emitter, etc.).

Figure 8:
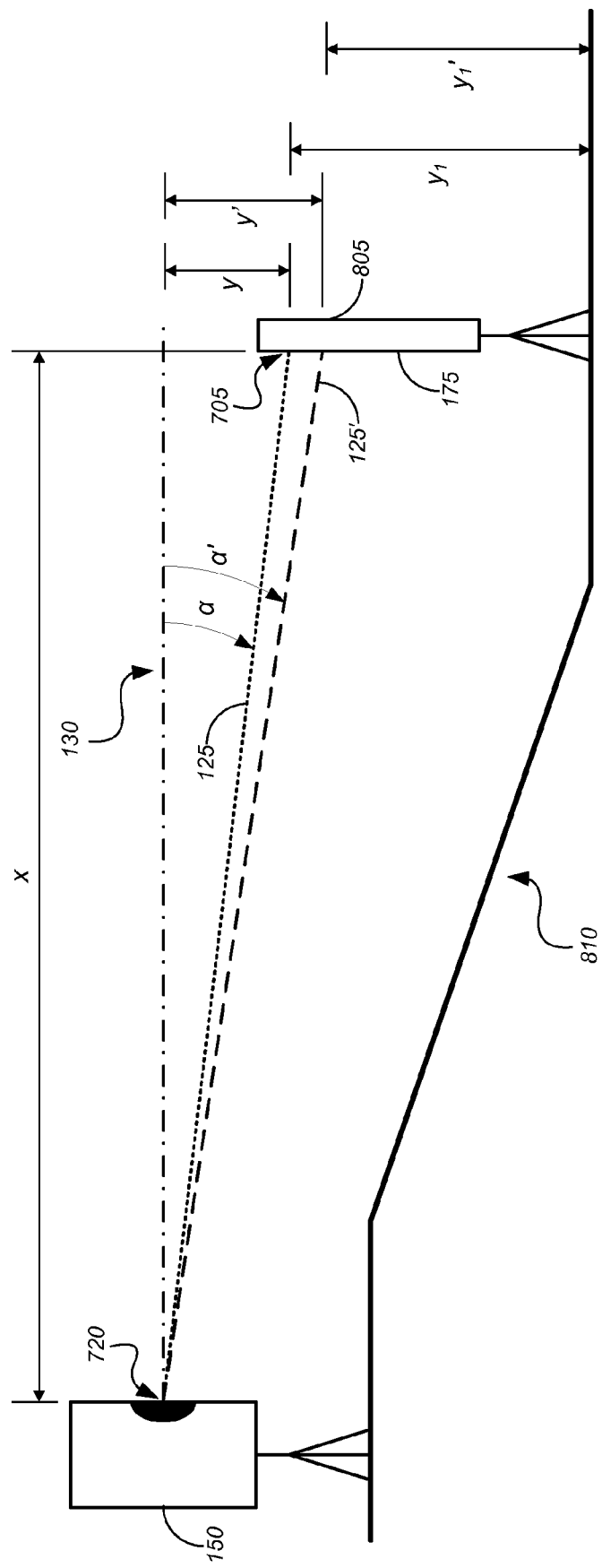

In certain cases, a mobile station may need to adjust its elevation calculations to account for the adjusted slope of the laser emitter. Hence, in a set of embodiments, if a mobile station determines that the slope of the emitted beam has changed (based on reception of a notification message from the laser source, by identifying a change in the laser strike location after requesting a slope adjustment, etc.), the processing system of the mobile station may adjust its calculation model accordingly. Merely by way of example, by reference to FIG. 8, before adjustment of the emitted beam 125, the mobile station (not pictured on FIG. 7) could calculate its elevation by determining the elevation difference y between the strike location 705 and the elevation of the emitter 720. As noted above, this elevation difference may be expressed, for example, as $$y = x \cdot \tan \alpha \qquad \text{(Eq. 1)}$$

where x is the horizontal distance from the emitter 720 to the detector 175, and $\alpha$ represents the angle between the horizontal plane 130 and the slope of the beam 125.

In embodiments in which the laser source effectively emits a conical or other non-planar beam, such as some of the embodiments described in the '623 Application, already incorporated by reference, a timing mechanism, several of which are disclosed in the '623 Application, may be implemented to determine the slope (described as "elevation angle" in the '623 Application) of the beam for purposes of calculating the elevation difference between the laser source and the mobile station. Merely by way of example, the '623 Application discloses the use of strobes to provide timing information to enable the mobile station (described as a "laser receiver" in the '623 Application) to determine the slope of the beam. In another embodiment, the '623 Application describes the use of a fixed time schedule for a complete cycle of raising and lowering the beam. The '623 Application further describes the use of radio transmissions to continuously transmit the slope of the beam from the laser source to the mobile station. Any of these techniques, as well as others, can be used to provide necessary information to allow the mobile station to determine the elevation difference between the laser source and the mobile station, especially in the case of a non-planar beam.

By adding (or subtracting, as appropriate), this elevation difference y to/from the emitter elevation, the elevation of the strike location 705 can be determined. In addition, the height $y_1$ of the strike location from the ground 810 is known (or can be calculated—for example, the mobile station might be programmed with a value for the distance from a reference point on the detector 175, such as the top or bottom of the detector 175, to the ground 810, and the distance from the strike location 705 to the reference point on the detector 175 can be determined by the mobile station based on the output from the detector 175). By subtracting this distance $y_1$ from the calculated elevation of the laser strike location 705, the elevation of the ground at the mobile station (i.e., the elevation of the mobile station) can be determined.

If, however, the beam slope angle $\alpha$ is adjusted so that the emitted beam 125' has a new slope $\alpha'$, the beam 125' will have a new strike location 805, which will have a new height $y_1'$ from the ground 810. The elevation difference y' between the new strike location 805 and the emitter 720 will be different from the elevation difference y between the original strike location 705 and the emitter 720 (assuming the mobile station has not moved and the elevation of the ground 810 therefore remains the same). To account for this change (from y to y'), the mobile station must update its calculation model to employ the new beam slope (represented by $\alpha'$), rather than the original beam slope (represented by $\alpha$), such that $$y' = x \cdot \tan \alpha' \qquad \text{(Eq. 2)}$$

It should be noted, of course, that other calculation models may be used to determine the elevation of the mobile station, and that the example above is provided merely for illustrative purposes.

Once the calculation model has been updated, the mobile station can calculate the elevation of the mobile station (or, more precisely, the elevation of the ground on which the mobile station sits). In some cases, as noted above, this will require determining the distance (either a horizontal distance or a straight-line distance) between the emitter and the beam strike location on the detector. Hence, the method 300 may comprise identifying a position of the mobile station and/or a position of the laser source (block 350), as described above, for example.

The method 300 may also comprise, at block 355, calculating, at the mobile station, an elevation of the mobile station. This calculation may be based on one or more factors including, without limitation, the positions(s) of the mobile station and/or the laser source, the distance between the two, the elevation of the laser source (or a component thereof, such as the laser emitter), the slope of the beam emitted by the laser emitter (which may be a slope that has been adjusted as described above), and/or input data received from the laser detector (e.g., data about the laser strike location on the laser detector). Merely by way of example, the calculation model described above may be used to calculate the elevation of the mobile station.

As noted above, in many cases, a mobile station may be attached to (or integrated within) a vehicle or other equipment that includes a tool, such as a shovel, blade, scoop, etc. In such cases, the mobile station may be configured to provide data and/or instructions for setting the height of the tool (relative to the mobile station, the equipment, the ground, etc.) (block 360). Merely by way of example, as noted above, a mobile station (or some components thereof) may be integrated with the control system; in many cases, such control systems are designed to set the height of a tool so as to produce a ground surface at a certain elevation. Based on a comparison of the elevation of the mobile station (which can be calculated as described above) with a desired ground elevation at the point of the mobile station, the control system for the equipment can be configured to set a height of the tool, such that the operation of the tool produces a new ground surface at the desired elevation.

Figure 9:
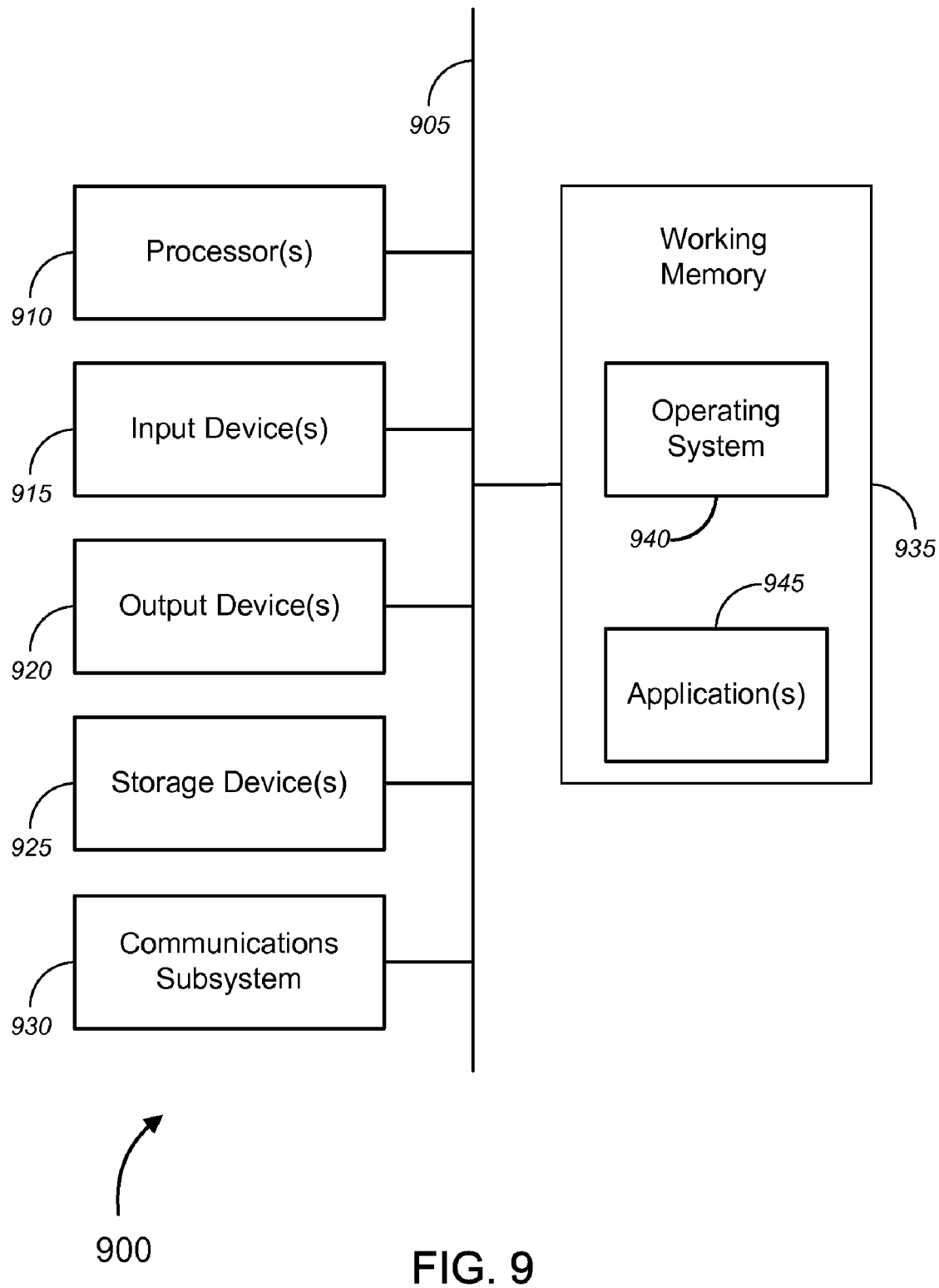
FIG. 9 is a generalized schematic diagram illustrating a computer system, in accordance with various embodiments of the invention.

FIG. 9 provides a schematic illustration of one embodiment of a computer system 900 that can perform the methods provided by various other embodiments, as described herein, and/or can function as a processing system for a laser source, a mobile station, an equipment control system, and/or the like It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein.

The communications subsystem 930 may also provide relatively local communications, using any of a variety of local communications technologies, such as serial communications, parallel communications, a universal serial bus ("USB"), other dedicated local communication facilities, and/or the like. In some cases, the communications subsystem 930 may be integrated with the bus 905, and therefore might provide direct communication between the bus 905 and other components outside the computer system (such as other components of a mobile station, laser source, etc.). In a particular set of embodiments, the communications subsystem 930 may serve as a communication system for a mobile station and/or a laser source that incorporates the computer system 900, while in other embodiments, the mobile station/laser source might implement a communication system separate from the computer system 900.

In many embodiments, the computer system 900 will further comprise a working memory 935, which can include a RAM or ROM device, as described above. The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 925. Volatile media includes, without limitation, dynamic memory, such as the working memory 935. Transmission media includes, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

While certain features and aspects have been described with respect to exemplary embodiments, one skilled in the art will recognize that numerous modifications are possible. For example, the methods and processes described herein may be implemented using hardware components, software components, and/or any combination thereof Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for estimating an elevation of a vehicle, the system comprising:
 a laser source, comprising:
  a rotating laser emitter configured to emit a spot beam having a slope that is adjustable by the laser source; and
  a first radio frequency communication ("RF") transceiver; and
 a mobile station configured to be mounted on a moving vehicle, the mobile station comprising:

a laser detector, comprising a substantially vertical array of laser sensors;
a global navigation satellite system ("GNSS") receiver;
a second RF transceiver; and
a processing system comprising a processor and a computer-readable medium having encoded thereon a set of instructions executable by the computer system to perform one or more operations, the set of instructions comprising:
instructions to establish an upper threshold value corresponding to a first portion of the array of laser sensors;
instructions to establish a lower threshold value corresponding to a second portion of the array of laser sensors;
instructions to receive input data from the laser detector;
instructions to determine, based on the input data, a laser strike location value corresponding to a portion of the laser detector receiving the spot beam emitted by the laser emitter;
instructions to compare the laser strike location value with at least one threshold value selected from the group consisting of the upper threshold value and the lower threshold value;
instructions to determine, based at least in part on a comparison of the laser strike location value with the at least one threshold value, an amount by which the slope of spot beam emitted by the laser emitter should be adjusted; and
instructions to transmit, via the second RF transceiver, a notification for reception by the first RF transceiver, the notification instructing the laser source to adjust the slope of the spot beam by the determined amount;
wherein the laser source is configured to adjust, upon receipt of the notification, the slope of the spot beam over a period during which the spot beam will not be received by the laser detector, and to transmit a message informing the mobile station of an adjusted slope of the spot beam emitted by the laser emitter; and
wherein the set of instructions further comprise:
instructions to determine, based on input from the GNSS receiver, a position of the mobile station; and
instructions to calculate an elevation of the mobile station, based at least in part on the adjusted slope of spot beam emitted by the rotating laser emitter, the position of the mobile station, a position of the laser source, and input data received from the laser detector.

2. The system of claim 1, wherein:
the set of instructions further comprises:
instructions to set a height of a tool on the vehicle, based at least in part on the calculated elevation of the mobile station device.

3. The system of claim 1, wherein the laser strike location is selected from the group consisting of an absolute elevation and an elevation relative to the laser detector.

4. The system of claim 1, wherein the mobile station is a first mobile station, the system further comprising:
a second mobile station, comprising:
a second laser detector;
a second GNSS receiver;
a third RF transceiver; and
a second computer system, the second computer system comprising a second processor and a second computer-readable medium, the second computer-readable medium having encoded thereon a set of instructions executable by the computer system to perform one or more operations, the set of instructions comprising:
instructions to determine, based on input from the second GNSS receiver, a position of the second mobile station;
instructions to receive second input data from the second laser detector; and
instructions to calculate, upon reception of the message from the laser source, an elevation of the second mobile station, based at least in part on the position of the second mobile station, a position of the laser source, the second input data from the second laser detector, and the adjusted slope of the spot beam emitted by the laser emitter.

5. A system, comprising:
a laser source, comprising:
a laser emitter configured to emit a beam having a slope that is adjustable by the laser source; and
a first communication system; and
a mobile station, comprising:
a laser detector;
a second communication system; and
a processing system comprising a processor and a computer-readable medium having encoded thereon a set of instructions executable by the processing system to perform one or more operations, the set of instructions comprising:
instructions to receive input data from the laser detector, the input data indicating a portion of the laser detector receiving the beam;
instructions to determine, based at least in part on the input data, that the slope of the beam should be adjusted;
instructions to transmit, via the second communication system, a notification for reception by the first communication system, the notification instructing the laser source to adjust the slope of the beam;
wherein the laser source is configured to adjust the slope of the beam based at least in part upon the notification.

6. A laser source, comprising:
a laser emitter configured to emit a beam having a slope that is adjustable by the laser source; and
a communication system;
wherein the laser source is configured to receive from a mobile station that receives the emitted beam, via the communication system, notification that the slope of the beam should be adjusted, wherein the mobile station is geographically distanced from the laser source and, to adjust the slope of the beam emitted by the laser emitter, based at least in part on the notification from the mobile station, and to transmit a message via the communication system comprising information about an adjusted slope of the beam emitted by the laser emitter.

7. The laser source recited by claim 6, wherein the laser emitter emits a spot beam.

8. The laser source recited by claim 6, wherein the laser emitter is a rotating laser emitter.

9. The laser source recited by claim 6, wherein the laser emitter is configured to emit a tilting plane beam.

10. The laser source recited by claim 6, wherein the laser emitter is configured to emit a beam that is raised and lowered to provide conical reference surfaces of varying inclination.

11. A mobile station, comprising:
a laser detector;
a communication system; and
a processing system comprising a processor and a computer-readable medium having encoded thereon a set of instructions executable by the processing system to perform one or more operations, the set of instructions comprising:
instructions to receive input data from the laser detector, the input data indicating a portion of the laser detector receiving a beam from a laser emitter;
instructions to determine, based at least in part on the input data, that the slope of the beam should be adjusted;
instructions to transmit, via the communication system, a notification instructing a laser source to adjust the slope of the beam;
instructions to determine a position of the mobile station; and
instructions to calculate an elevation of the mobile station, based at least in part on an adjusted slope of spot beam emitted by the rotating laser emitter, the position of the mobile station, a position of the laser source, and input data received from the laser detector.

12. A method, comprising:
providing, at a first location, a laser source comprising a laser emitter;
providing, at a second location, a mobile station comprising a laser detector;
emitting a beam from the laser emitter, the slope of the beam being adjustable by the laser source;
receiving the emitted beam at a portion of the laser detector;
determining, based at least in part on the portion of the laser detector receiving the emitted beam, that the slope of the emitted beam should be adjusted;
transmitting, from the mobile station, a notification instruction instructing the laser source to adjust the slope of the emitted beam;
adjusting, at the laser source, the slope of the emitted beam, based at least in part upon the notification.

13. The method of claim 12, further comprising:
determining a velocity and direction of travel of the mobile station;
wherein determining that the slope of the emitted beam should be adjusted comprises determining, based on the portion of the laser detector receiving the emitted beam, the velocity of the mobile station, and the direction of travel of the mobile station, that the slope of the emitted beam should be adjusted.

14. The method of claim 12, wherein determining that the slope of the emitted beam should be adjusted comprises determining an amount by which the slope of the emitted beam should be adjusted, and wherein adjusting the slope of the emitted beam comprises adjusting the slope of the beam by the determined amount.

15. The method of claim 14, wherein determining an amount by which the slope of the emitted beam should be adjusted comprises determining an acceptable range of slope values for the emitted beam, and wherein adjusting the slope of the emitted beam comprises adjusting the slope of the beam to a value within the acceptable range of slope values.

16. The method of claim 15, wherein the mobile station is a first mobile station, and wherein adjusting the slope of the emitted beam comprises selecting a value within the acceptable range of slope values, wherein the selected value also allows a second mobile station to receive the emitted beam.

17. The method of claim 16, further comprising notifying a second mobile station of the adjusted slope of the emitted beam.

18. The method of claim 16, wherein selecting a value within the acceptable range of slope values comprises prioritizing one of the mobile stations over the other mobile station.

19. The method of claim 18, wherein the first mobile station is mounted on a vehicle and wherein prioritizing one of the mobile stations comprises prioritizing the first mobile station because the first mobile station is mounted on a vehicle.

20. The method of claim 14, wherein determining an amount by which the slope of the emitted beam should be adjusted comprises:
calculating a distance between the first location and the second location; and
determining the amount by which the slope of the beam should be adjusted based at least in part on the portion of the laser detector receiving the emitted beam and the distance between the first location and the second location.

21. The method of claim 20, wherein the mobile station further comprises a position-sensing device, the method further comprising identifying, with the position-sensing device, the second location.

22. The method of claim 21, wherein the position-determining device comprises a global navigation satellite system ("GNSS") receiver.

23. The method of claim 20, further comprising, receiving, at the mobile station and from the laser source, identification of the first location.

24. The method of claim 12, wherein the laser detector comprises a substantially vertical array of laser sensors, and wherein determining that the slope of the emitted beam should be adjusted comprises:
establishing an upper threshold value corresponding to a first portion of the array of laser sensors;
establishing a lower threshold value corresponding to a second portion of the array of laser sensors;
determining a laser strike location value corresponding to the portion of the laser detector receiving the emitted beam; and
comparing the laser strike location value with at least one threshold value selected from the group consisting of the upper threshold value and the lower threshold value.

25. The method of claim 12, wherein receiving the emitted beam at a portion of the laser detector comprises:
receiving, at a first point in time, the emitted beam at a first portion of the laser detector; and
receiving, at a second point in time, the emitted beam at a second portion of the laser detector.

26. The method of claim 25, wherein determining that the slope of the emitted beam should be adjusted comprises:
determining a first laser strike location value corresponding to the first portion of the laser detector;
determining a second laser strike location value corresponding to the second portion of the laser detector; and
comparing the first laser strike location value with the second laser strike location value.

27. The method of claim 12, further comprising:
calculating an elevation of the mobile station, based at least in part on the adjusted slope of the emitted beam and the portion of the laser detector at which the emitted beam is received.

28. The method of claim 27, wherein the mobile station is mounted on a vehicle, the method further comprising:
setting a height of a tool on the vehicle, based at least in part on the calculated elevation of the mobile station.

* * * * *